United States Patent [19]

Freytag et al.

[11] 3,981,846

[45] Sept. 21, 1976

[54] WORKABLE AND THERMAL STABLE INTERPOLYMERS OF DICARBOXYLIC ACID ESTERS AND VINYL CHLORIDE

[75] Inventors: Johannes Freytag, Troisdorf-Siegler; Hans-Ewald Konermann, Troisdorf-Oberlar, both of Germany

[73] Assignee: Dynamit Nobel Aktiengesellschaft, Troisdorf, Germany

[22] Filed: June 29, 1973

[21] Appl. No.: 375,210

Related U.S. Application Data

[63] Continuation of Ser. No. 139,140, April 30, 1971, abandoned.

[30] Foreign Application Priority Data

May 5, 1970 Germany............................ 2021938
June 2, 1970 Germany............................ 2026821

[52] U.S. Cl. .............................. 526/227; 260/2.5 P; 260/45.95 R; 526/324
[51] Int. Cl.² .................... C08F 15/32; C08F 45/58

[58] Field of Search................ 260/78.5 CL, 78.5 T, 260/92.8 A

[56] References Cited
UNITED STATES PATENTS

| | | | |
|---|---|---|---|
| 2,628,214 | 2/1953 | Pinkney ............................. | 260/94.7 |
| 3,017,379 | 1/1962 | Feild .................................... | 260/41 |
| 3,488,392 | 1/1970 | McKellin ........................... | 260/607 |
| 3,544,661 | 12/1970 | Oth .................................... | 260/879 |
| 3,558,566 | 1/1971 | Balwe ............................... | 260/78.5 |

*Primary Examiner*—Christopher A. Henderson, Jr.
*Attorney, Agent, or Firm*—Burgess, Dinklage & Sprung

[57] ABSTRACT

Copolymers of vinyl chloride and maleic or fumaric acid diester, which have good workability, are improved by incorporating therein an organic peroxide as a cross-linking agent. Products formed from the resin, which can be foamed articles, have improved thermal stability.

4 Claims, No Drawings

WORKABLE AND THERMAL STABLE INTERPOLYMERS OF DICARBOXYLIC ACID ESTERS AND VINYL CHLORIDE

This is a continuation of application Ser. No. 139,140, filed Apr. 30, 1971, now abandoned.

BACKGROUND

Copolymers of vinyl chloride and maleic acid esters and/or fumaric acid esters are known. They are characterized, even in the presence of plasticizers, by good workability, e.g., fluidity in the melted state, so that moldings, sheets, wire insulation or the like can be made better than they can from polyvinyl chloride homopolymers. See, for example, Kainer, "Polyvinylchlorid und vinylchlorid-Mischpolymerisate," 1965, p. 105, and British Pat. Nos. 466,898 and 487,593. The products made from the copolymers, however, are inferior to those made from polyvinyl chloride homopolymers, for example in regard to their thermal stability. There is therefore a need to compensate for this disadvantage.

THE INVENTION

It has surprisingly been possible by the method of the invention to improve substantially the properties of products made from the above-named copolymers.

The subject of the invention is a process for the manufacture of formed products of high thermal stability from copolymers of vinyl chloride with fumaric acid esters and/or maleic acid esters or corresponding copolymer mixtures, which is characterized in that a homogeneous or uniform mixture is prepared at temperatures of 130° to 175°C, or 145° to 175°C, or 130° to 160°C of products of the stated kind, plasticizers, stabilizers, lubricants and in some cases pigments and/or fillers, this mixture is cooled to 110° to 130°C, organic peroxides, as cross-linking agents which start at temperatures above 150°C are incorporated, and the granules or powder thus obtained are made into formed products in a conventional manner, and then the products are heated, preferably under pressure, to the starting temperature of the peroxides or slightly above, until the desired cross-linking of the copolymers has taken place.

The present process can also serve for the manufacture of foam products by proceeding as described above, especially mixing in said range of 130° to 160°C, and uniformly incorporating, as an additional component of the mixture containing the copolymers, solid organic blowing agents whose decomposition temperature is above the working temperature involved, and, after the addition of organic peroxides, foaming the powders, hides or granules, with or without the use of additional gas pressure, to produce crosslinked foam products.

It is known that products with a cellular structure can be produced from polyvinyl chloride by the addition of blowing agents; see, for example, Kunststoffe, 1965, pp. 717 to 723. For some applications, however, it is desirable to improve the thermal stability of such products. This is achieved by the manufacture of molded foam products in the framework of the invention by the above-described foaming and cross-linking, setting out from copolymers and copolymer mixtures.

Preferably one uses according to the invention copolymers or copolymer mixtures containing 2 to 20, preferably 6 to 10, wt.% of the comonomer or comonomers condensed with the vinyl chloride, i.e., the comonomer is 2 to 20, preferably 6 to 10, wt.% of the comonomer plus vinyl chloride from which the copolymer is formed. The comonomers are diester aliphatic $C_6$ to $C_{18}$ alcohols, especially $C_6$ to $C_{18}$ monohydric primary alcohols.

Particularly high degrees of cross-linking are obtained by adding, in addition to the organic peroxides described, other suitable organic compounds having a plurality of reactive double bonds, to serve as cross-linking adjuvants. Triallylisocyanurate, diallylphthalate, divinylbenzene and ethylenedimethacrylate have proven especially useful. These adjuvants can be incorporated into the mixture even in the first step of the process. They can be used in amount of 2 to 5 wt.% of the copolymer.

Peroxides suitable for the cross-linking are those organic peroxides of the formula R—O—O—R' in which R and R' are organic groups, known for the service. It can be for example: dicumylperoxide, tert, butylcumylperoxide, 1,3-bis-(tert. butylperoxyisopropyl)-benzene, 2,5-bis-(tert. butylperoxy) - 2,5-dimethylhexane or hexene-3, cyclic perketals, such as for example 1,1,4,4-7,7-hexamethyl-cyclo 5,6,8,9-tetraoxanonane, phthalide peroxide, or the like. The quantities used amount, for example, to 1 to 6 wt.% of the weight of copolymers.

Suitable plasticizers are those known for the service. It can be, for example, esters of phthalic acid, adipic acid, sebacic acid, long-chained alkylsulfonic acids (commercial name Mesamoll of Farbenfabriken Bayer, A.G.) or trimellitic acid, epoxidized soybean oil, or the like; the quantities run between 2 and 100% of the weight of the copolymers, depending on the degree of stiffness desired.

Stabilizer are, as are known and usual for the service, lead salts, Ba-Cd compounds, or organic tin compounds, for example, and, additionally thereto in some cases, non-discoloring thermostabilizers, for example dian-2,2-Bis-(4'-Hydroxyphenyl)-Propan styrolized phenol as obtained by the reaction of phenol with styrene in the presence of peroxides, 2,2,4-trimethyl-1,2-dihydroquinoline, or the like. They can be used in the amounts, e.g., 0.1 to 0.2 wt.% of the copolymer.

Blowing agents known for the service can be used. Examples of blowing agents for the production of foam products are solid organic blowing agents, e.g., azodicarbonamide, diphenylsulfone-3,3-disulfone-hydrazide, sulfonehydrazide, or other substance which yield gases or decompose to gases at temperatures above the temperature of the mixture. They can be used in amount of 0.5 to 3 wt.% of the copolymer.

The additives such as plasticizer and the peroxide and cross-linking adjuvant, if used, can be combined on a roll mill, whereby a hide or sheet is produced. The hide can be comminuted to form granules, and the granules can be fabricated in a second process step by extrusion, injection molding, compression molding or rolling, and in some cases, with the addition of blowing agents, the resin is made into foam products.

The preparation of a compound in accordance with the first step of the process can also be performed in a conventional Henschel-fluid mixer. (a rotation mixing machine, produced by Henschel AG, Kassel, W-Germany) In that case, the material is combined with plasticizers, stabilizers, lubricants and, if desired, pigments, at temperatures up to 150°C for example, to make a premix. The contents of the mixer are cooled to 120°C, for example, and not until then are the peroxide and the cross-linking adjuvant added and uniformly distributed with the mixer running slowly. In this manner a free-flowing dry-blend powder is obtained, which can be fabricated by injection molding or extrusion.

The granules or dry-blend mixtures prepared by the processes described can be fabricated either in a heated mold, in a hand press or in an extruder, or it can be injection molded. In every case a dimensionally accurate products is first produced, such as an extrusion or a covering on a wire or an injection molding, which then, after being shaped to the final form is cross-linked by heat and, in some cases, pressure. For example, first a wire is covered with the thermoplastic compound in an extruder with a cross-head mounted on it. The wire with its covering is then placed in an autoclave or in a vulcanizing tube and exposed to a temperature of, for example, more than 180°C, and to a gas pressure of more than 8 to 10 or 15 atmospheres excess pressure. It is advantageous in this case to use inert gases or vapors, such as high-pressure steam or nitrogen, the access of oxygen being thereby prevented during the cross-linking process. The application of pressure also prevents the formation of bubbles in the extrudate and has a favorable effect on the degree of cross-linking.

In the injection molding process the granules or the dry-blend mixture are injection molded on a conventional injection molding machine, the die being heated to a cross-linking temperature of, for example, 180° to 200°C, and then cooled down. Here again the production of pressure, e.g., 8 to 15 atm., in the die, for example by the injection of nitrogen at 15 atmospheres excess pressure, has a distinct influence on the cross-linking speed and the degree of cross-linking, the pressurizing medium being advantageously preheated.

The degree of cross-linking has been determined by ascertaining the solubility (wt.%) in boiling tetrahydrofuran (90 min. of refluxing), the insoluble portion being regarded as cross-linked. The degree of cross-linking can best be 85–97 wt.% and is preferably 70–80 wt.%.

To prepare foam products in accordance with the invention a hide produced in a roll mixer and having a thickness of 1 to 10 mm can be transported on a conveyor belt through a high-frequency field, for example. With this form of energy, the heat necessary for achieving the activation temperature of the peroxides can be produced uniformly and rapidly from the inside of the foamable mixture to the outside. By varying the belt velocity and the temperature the process can be controlled such that in the first phase a product having a cellular structure is formed by the decomposition of the blowing agent, and in the second phase the cross-linking reaction takes place.

It is also possible, however, to produce foam products from granules. A hide can be comminuted after the cooling process. The granules can be processed in an injection molding machine of conventional design equipped with a needle-valved nozzle. The procedure can be to inject the melted mixture containing blowing agent into a heated mold (temperature, for example, 180°–200°C). The die can be under a gas pressure of about 8 to 15 atmospheres of nitrogen, and is advantageously preheated.

Thus, the invention provides a process for production of a vinyl chloride resin having good workability and formable into an article having high thermal stability.

The process comprises mixing a vinyl chloride polymer which is a copolymer of vinyl chloride and at least one of fumaric acid diesters and maleic acid diesters, and at least one additive, at a temperature of 130°–175°C. The resulting admixture is then cooled to 110° to 130°C, and the cooled admixture is then mixed with an organic peroxide cross-linking agent having a starting temperature above 150°C.

The resin can be formed into a shaped article. The shaped article can be heated to at least the starting temperature of the cross-linking agent to effect cross-linking of the copolymer.

The additive can include a blowing agent having a starting temperature above the temperature at which the copolymer and additive or additives are mixed. A foamed, cross-linked article can be formed therefrom by heating the resin to at least above the starting temperatures of the cross-linking agent and the blowing agent. Desirably, said heating is performed in an inert atmosphere at elevated pressure.

EXAMPLE 1

100 weight-parts of a copolymer produced from 92 weight percent vinyl chloride and about 8 weight percent fumaric acid dicetyl ester of a K value of 68 is mixed with 30 weight-parts of di-2-ethylhexylphthalate, 7 weight-parts of lead phthalate and one weight-part of neutral lead stearate on a roll mixer at about 160° to 170°C. Finally the mixer and hide or sheet are cooled to about 120°C and 3 weight-parts of dicumyl peroxide plus 3 weight-parts of triallylcyanurate are uniformly distributed and mixed into the plastic mass with the roll mixer. After cooling the hide is comminuted. Wire coverings are extruded from the granules on a single-spindle extruder of conventional construction with a crosshead mounted on it. The wire together with the insulation is then exposed in an autoclave or in a pressure tube to a temperature of 180°C and a nitrogen pressure of over 8 atmospheres gauge pressure. The soft polyvinyl chloride compound is cross-linked by this treatment within a few minutes to form heat-resistant coating.

EXAMPLE 2

A premix is prepared from 100 parts by weight of a copolymer of vinyl chloride (94 wt.%) and fumaric acid dicetyl ester (6 wt.%) of a K value of 57, plus 40 weight parts di-2-ethylhexylphthalate, 7 weight-parts lead phthalate and 1 weight-part of neutral lead stearate, in a fluid mixer at temperatures up to 150°C. Then the mixer content is cooled to about 120°C and 3 weight-parts of 1,3-bis-(tert. butylperoxyisopropyl)-benzene plus 3 weight-parts triallyl cyanurate are uniformly divided and mixed in, with the mixer running slowly. In this manner a freeflowing dry blend powder is obtained, which can be injection molded on an injection molding machine of conventional construction. The injection mold is heated to at least 180°C and placed under a pressure of more than 12 to 15 atmospheres gauge pressure.

EXAMPLE 3

100 weight-parts of the copolymer of Example 2 with a K value of 57 is mixed with 90 weight-parts of trialfol-8,10-trimellitate, Tri (n-Oktyl. n-Decyl-Trimellitate). 7 weight-parts lead phthalate and 1 weight-part neutral lead stearate on a roll mixer at about 150° to 160°C. After the hide was cooled to about 120°C, 3 weight-parts of teritary butylcumylperoxide and 3 weight-parts of triallylcyanurate are uniformly mixed into the plastic mass with the roll mixer. After cooling the hide is comminuted. The granules are then exposed in a heated compression mold to a temperature of 180°–190°C (total heating time about 40 minutes). A block material is obtained whose degree of cross-linking amounts to 75%.

EXAMPLE 4

| | Cross-linked batch | Uncross-linked batch |
| --- | --- | --- |
| Weight-parts copolymer as in Example 1, K value 68 | 100 | 100 |
| Weight-parts neutral lead phthalate | 7 | 7 |
| Weight-part neutral lead stearate | 1 | 1 |
| Weight-parts di-2-ethylhexylphthalate | 30 | 30 |
| Weight-parts triallyl cyanurate | 3 | |
| Weight-parts dicumylperoxide | 3 | — |
| Tensile strength (kp/cm²) | 220 | 165 |
| Elongation % | 185 | 250 |
| Shore Hardness A | | |
| 25°C | 87 | 84 |
| 40°C | 71 | 70 |
| 60°C | 60 | 65 |
| 80°C | 58 | 51 |
| 100°C | 47 | 45 |

The deformation was determined with a consistometer after loading a 6 mm thick plate with 10 kp/cm² for 1 hour. Deformation in % at:

| | | |
| --- | --- | --- |
| 20°C | 8 | 9 |
| 40°C | 16 | 20 |
| 60°C | 22 | 32 |
| 80°C | 27 | 47 |
| 100°C | 35 | 62 |
| Degree of cross-linking | 94% | 0* |

*soluble in tetrahydrofuran

If the above formula is used without the cross-linking adjuvant (triallylcyanurate), the cross-linking degree is only slightly lower, namely 93%. In other cases, however, the addition of the cross-linking adjuvant brought about an appreciable increase in the cross-linking, as illustrated by the following case.

100 weight-parts copolymer of Example 1
3 weight-parts epoxidized soybean oil
0.9 weight-parts solid Ba-Cd stabilizer
0.3 weight-parts organic phosphite
2 weight-parts dicumyl peroxide,
Degree of cross-linking: 91%.
With the addition of 3 weight-parts of triallylcyanurate: 95%.

EXAMPLE 5

100 weight-parts of a copolymer produced from 92 weight-percent vinyl chloride and about 8 weight-percent fumaric acid dicetyl ester with a K value of 57 is mixed with 90 weight-parts of di-2-ethylhexylphthalate, 7 weight-parts lead phthalate, 1 weight-part neutral lead stearate and 1 weight-part azodicarbonamide on a roll mixer at temperatures of about 150°C. After cooling the hide to about 120°C, 3 weight-parts of 1,3-bis-(tert. butylperoxyisopropyl)-benzene and 3 weight-parts triallylcyanurate was uniformly mixed in with the roll mixer. After cooling, the hide, 6 mm thick, is laid in a box mold measuring 200 × 200 × 25 mm. After heating the mold, which is not hermetrically sealed, in a press at 180° to 185°C for 40 minutes, a foam block is obtained whose bulk weight is 300 grams per liter. The degree of cross-linking is 79%.

EXAMPLE 6

A homogeneous, plastic hide is prepared on a roll mixer at temperatures up to 150°C from 100 weight-parts of copolymer of vinyl chloride (80 wt.%) and fumaric acid dicetyl ester (20 wt.%), 100 weight-parts di-2-ethyl-hexylphthalate, 7 weight-parts lead phthalate, 1 weight-part lead stearate and 1 weight-part azodicarbonamide. After the cooling of the mixer and hide to temperatures of 120°–130°C, 3 weight-parts triallylcyanurate and 3 weight-parts tertiary butylcumylperoxide is uniformly mixed into the hide with the roll mixer. After cooling, the hide is granulated and the granules are fabricated on an injection molding machine with a needle-valved nozzle. The injection mold is heated to 180°–200°C and filled with preheated nitrogen at 15 atmospheres gauge pressure.

After the injection of the thermoplastic melt into the hot mold, the compound cross-links and is given a foam structure by the decomposing blowing agent. The bulk weight of the injection-molded piece amount to 290 g/l and the degree of cross-linking is 76%.

EXAMPLE 7

100 weight-parts of copolymer of vinyl chloride (90 wt.%) and fumaric acid dicetyl ester (10 wt.%), of a K value of 57 are carefully mixed with 50 weight-parts of trialkfol 8, 10-trimellitate, N-Oktyl-N-Decyl-7 weight-parts lead phthalate, 1 weight-part neutral lead stearate and 1 weight-part azodicarbonamide in a fluid mixer at temperatures up to 150°C. Finally the mixer content is cooled down to about 120° to 130°C and 3 weight parts triallylcyanurate and 3 weight-parts dicumylperoxide are added and uniformly distributed with the mixer running slowly. After the cooling of the mixture a dry, free-flowing powder is obtained which can be fabricated by the injection-molding process on machines of conventional construction using a needle-valved nozzle. The working temperature in the barrel of the injection molding machine amounts, for example, to 140° to 150°C. The injection mold is heated to 180°–185°C and is filled with preheated nitrogen at 15 atmospheres excess pressure.

When the additional gas pressure (15 atmospheres) is used in the mold, a better surface quality is obtained and the foamed pieces has an especially finely porous structure. Furthermore, the use of additional gas pressure accelerates the cross-linking reaction.

The degree of cross-linking amounts to 88%, and the bulk density of the injection-molded piece is 360 g/l.

EXAMPLE 8

100 weight-part of copolymer of vinyl chloride (98 wt.%) and fumaric acid dicetyl ester (2 wt.%), having a K value of 55, is plasticized on a roll mixer at temperatures up to 155°C so as to mix it intimately with 3 weight-parts of eposidized soybean oil, 1.8 weight-parts of dialkyl tin mercaptide, 1.2 parts of dibutyl tin maleate, 0.5 weight-parts paraffin wax, 0.1 weight-part dian and 1 weight-part azodicarbonamide. After the hide is cooled to about 120° to 130°C, 3 weight-parts of triallyl cyanurate and 3 weight-parts of dicumyl peroxide are carefully distributed in the hide with the roll mixer. After cooling, the approximately 6 mm thick hide is placed in a box which is not hermetically sealed, measuring 200 × 200 × 25 mm, and heated in a press for 40 minutes at 180°–185°C. From the hide a hard foam block is obtained having a bulk density of 310 g/l. A specimen sawed from the block has a weight loss of only 4.5% after 90 minutes of treatment with boiling tetrahydrofuran. The cross-linking obtained thus amounts to 95.4% of the compound.

What is claimed is:

1. Vinyl chloride resin having good workability and formable into articles having high thermal stability which comprises:
   a. vinyl chloride polymer which is a copolymer of vinyl chloride and cetyl alcohol diester of at least one of fumaric acid and maleic,
   b. additives including
      1. a plasticizer, and
      2. an organic peroxide cross-linking agent having a starting temperature above 150°C.

2. Resin according to claim 1, the diester being 2 to 20 wt.% of the diester plus vinyl chloride, and the cross-linking agent being 1 to 6 wt.% of the copolymer.

3. Resin according to claim 2, said additives further including stabilizer and lubricant.

4. Shaped article formed from resin according to claim 3 by shaping the resin and heating to cross-link the polymer.

* * * * *

UNITED STATES PATENT AND TRADEMARK OFFICE
CERTIFICATE OF CORRECTION

PATENT NO. : 3,981,846
DATED : September 21, 1976
INVENTOR(S) : Johannes Freytag and Hans-Ewald Konermann It is certified that error appears in the above-identified patent and that said Letters Patent are hereby corrected as shown below:

Column 7, line 14, after "maleic" insert --acid--.

Signed and Sealed this

Twenty-second Day of March 1977

[SEAL]

Attest:

RUTH C. MASON
Attesting Officer

C. MARSHALL DANN
Commissioner of Patents and Trademarks